(12) United States Patent
Vijendra et al.

(10) Patent No.: US 10,229,026 B1
(45) Date of Patent: Mar. 12, 2019

(54) METHOD AND APPARATUS FOR PROVIDING ENVIRONMENTAL MANAGEMENT IN DISTRIBUTED SYSTEM DATA CENTERS

(75) Inventors: Sudhir Vijendra, White Plains, NY (US); Patricia Florissi, Briarcliff Manor, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2017 days.

(21) Appl. No.: 11/985,610

(22) Filed: Nov. 17, 2007

(51) Int. Cl.
*G06F 11/30* (2006.01)

(52) U.S. Cl.
CPC .................. *G06F 11/3058* (2013.01)

(58) Field of Classification Search
CPC ..................................................... G06F 11/3058
See application file for complete search history.

(56) References Cited

U.S. PATENT DOCUMENTS

| | | | |
|---|---|---|---|
| 5,528,516 A * | 6/1996 | Yemini et al. | 702/181 |
| 5,661,668 A | 8/1997 | Yemini | |
| 5,815,657 A * | 9/1998 | Williams et al. | 705/35 |
| 6,138,249 A * | 10/2000 | Nolet | 714/25 |
| 6,198,628 B1 * | 3/2001 | Smith | H05K 7/20572 361/695 |
| 6,249,755 B1 * | 6/2001 | Yemini et al. | 702/183 |
| 6,487,562 B1 * | 11/2002 | Mason et al. | |
| 6,868,367 B2 | 3/2005 | Yemini | |
| 6,965,845 B2 * | 11/2005 | Ohsie et al. | 702/181 |
| 7,003,433 B2 | 2/2006 | Yemini | |
| 7,107,185 B1 | 9/2006 | Yemini | |
| 7,275,250 B1 * | 9/2007 | Novik et al. | 719/318 |
| 7,668,953 B1 * | 2/2010 | Sinclair et al. | 709/224 |
| 7,792,045 B1 * | 9/2010 | Vijendra | 370/244 |
| 2002/0152185 A1 * | 10/2002 | Satish Jamadagni | 706/1 |

(Continued)

OTHER PUBLICATIONS

EMC White Paper, "EMC Smarts IP Availability Manager," Nov. 2005, all pages.*

(Continued)

*Primary Examiner* — Jacob C. Coppola
(74) *Attorney, Agent, or Firm* — Krishnendu Gupta; Deepika Bhayana; Anne-Marie Dinius

(57) ABSTRACT

A computer system-based method and system for modeling, planning and analyzing distributed systems in view of environmental considerations in the deployment of said distributed system is disclosed. The method comprises the steps of representing selected ones of a plurality of components and relationships among selected components with said distributed system, wherein said representation includes attributes and characteristics associated with environmental considerations, identifying a location of each of said selected components in said distributed system determining an environmental aspect of each of said identified locations, and providing a recommendation based on said environmental aspects. In one aspect of the invention, an analysis is performed that determines a cause of changes in environmental conditions and a recommendation is made to correct the cause of the environment changes. In another aspect of the invention an analysis may be performed that considers environmental aspects in adjusting economic consideration for storing data in a data center.

23 Claims, 14 Drawing Sheets

(56) References Cited

U.S. PATENT DOCUMENTS

| | | | |
|---|---|---|---|
| 2003/0147216 A1* | 8/2003 | Patel | H05K 7/20754 361/700 |
| 2004/0064558 A1* | 4/2004 | Miyake | 709/226 |
| 2004/0249610 A1* | 12/2004 | Ohsie et al. | 702/185 |
| 2005/0021742 A1* | 1/2005 | Yemini et al. | 709/224 |
| 2005/0128212 A1* | 6/2005 | Edecker | G06T 17/05 345/582 |
| 2006/0179348 A1* | 8/2006 | Florissi et al. | 714/30 |
| 2007/0094378 A1* | 4/2007 | Baldwin et al. | 709/223 |
| 2007/0165377 A1* | 7/2007 | Rasmussen | H05K 7/2079 361/695 |
| 2009/0021908 A1* | 1/2009 | Patel | G06F 1/20 361/688 |
| 2009/0144039 A1* | 6/2009 | Thorsteinsson | B63B 9/001 703/6 |

OTHER PUBLICATIONS

EMC White Paper, "EMC Smarts Openness," Dec. 2003, all pages.*
DMTF, "Common Information Model (CIM) Infrastructure Specification," version 2.3, Oct. 2005, all pages.*
DMTF, "CIM Event Model White Paper," version 2.1, Jun. 2003, all pages.*
System Management ARTS, Inc. (SMARTS), "InCharge: IP Availability Manager Users Guide," version 6.2, 2004, all pages.*

* cited by examiner

FIG. 10

ROOM

| P \ S | MOISTURE | COOLING | HEAT | POWER | AIR POLLUTION | TEMPERATURE | MOLD |
|---|---|---|---|---|---|---|---|
| COOLING/ HEAT | | 1 | 1 | | | 1 | |
| MOISTURE | 1 | | | | | 1 | 1 |
| HEAT | | 1 | | | | | |
| POWER | | | 1 | 1 | | | |
| ENVIRONMENT | | | | | 1 | | |

METHOD AND APPARATUS FOR PROVIDING ENVIRONMENTAL MANAGEMENT IN DISTRIBUTED SYSTEM DATA CENTERS

FIELD OF THE INVENTION

The invention relates generally to distribute system management, and more specifically to method and apparatus for managing the environmental aspects of distributed system configurations.

BACKGROUND OF THE INVENTION

With the ever-increasing expansion of distributed systems, such as local area network, wide-area networks, public networks, etc., and the associated increased equipments, increases in physical space, power consumption, air-conditioning requirements, heat generation, and other environmental aspects, have become of greater concern not only for the cost in providing these resources but also the effect of the consumption of these resources on the environment. For example, as new equipments are added to the distributed system, the new equipment requires a power connection to the electrical grid and generates heat that requires air conditioning to maintain the new equipment, or the physical location in which the new equipment resides, within a desired temperature range.

Although newer equipment have been designed and developed to occupy less physical space, consume less power, generate less heat and require less air-conditioning, their inclusion in the distributed system typically does not decrease the overall space, power, air-conditioning and heat parameters of the distributed system as older, more power hungry, equipments remain in the distributed system. In some cases, older equipment remains in the distributed system for fear of not knowing exactly the effect of the removal of such older equipment on the distributed system. Thus, rather than having newer equipments replace the older legacy equipment, the new equipment may only replace the function of the older equipment while the older equipment continues to occupy space, consume power, and generate heat.

In addition, as distributed systems first developed, and subsequently expanded, no consider was made to the physical organization of the distributed system components, e.g., router, switches, servers, or the power consumption. Rather, components were located in available locations and as long as there was sufficient available power and air-conditioning, no special consideration was made with regard to the environmental impact of the organizational development of the distributed system.

However, with the increased concern of global warming, there is a need in the industry for providing tools for developing or expanding distributed systems while considering the environmental impact of the existing distributed systems components and introduction of new components.

SUMMARY OF THE INVENTION

A computer system-based method and system for modeling, planning and analyzing distributed systems in view of environmental considerations in the deployment of said distributed system is disclosed. The method comprises the steps of representing selected ones of a plurality of components and relationships among selected components with said distributed system, wherein said representation includes attributes and characteristics associated with environmental considerations, identifying a location of each of said selected components in said distributed system determining an environmental aspect of each of said identified locations, and providing a recommendation based on said environmental aspects. In one aspect of the invention, an analysis is performed that determines a cause of environmental alteration and a recommendation is made to correct the cause. In another aspect of the invention an analysis is performed considering environmental characteristics in addition to economic consideration.

DETAILED DESCRIPTION OF THE FIGURES

FIG. 10 illustrates an exemplary analysis model in accordance with the principles of the invention;

Figure 1:
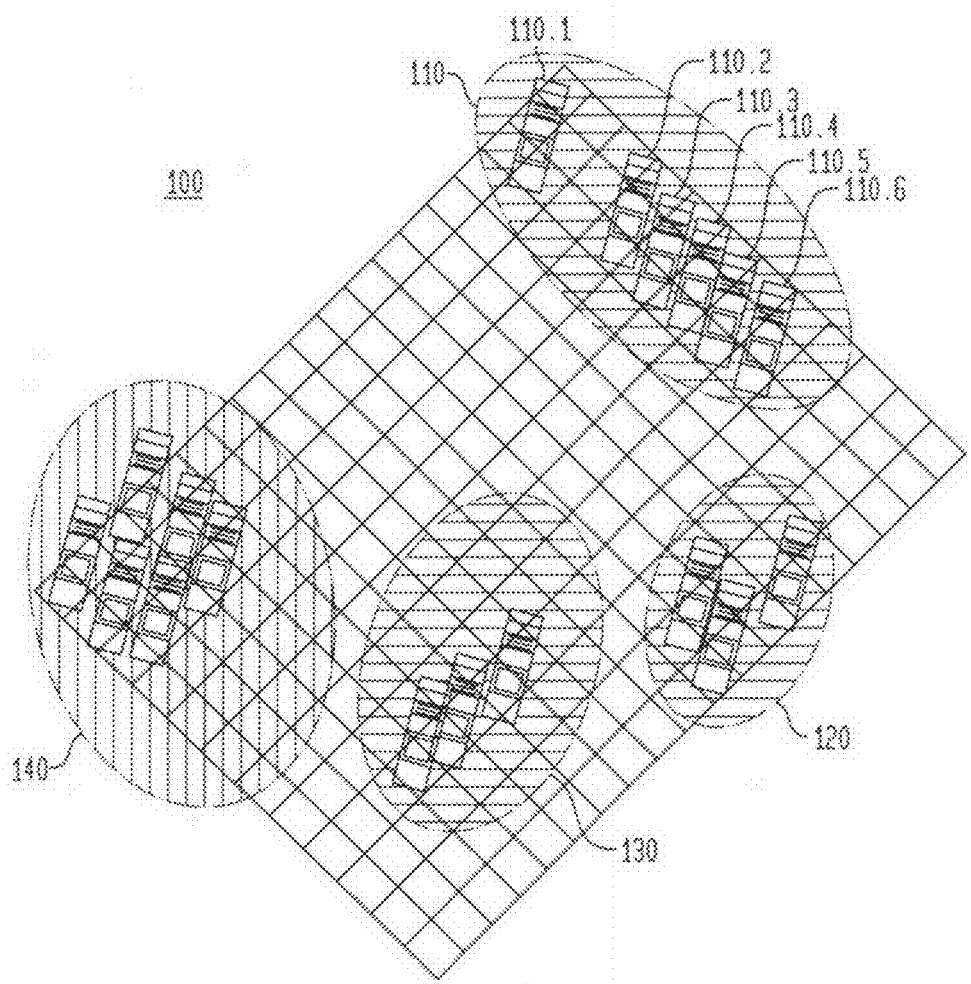
FIG. 1 illustrates a conventional layout of a data center.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates a conventional layout of an exemplary distributed system data center composed of a plurality of equipment or components representing routers, servers, printers, display devices (CRTs, LCD), storage devices, etc. As shown the equipments are grouped in clusters 110, 120, 130 and 140. Such equipment cluster may have been developed based, for example, on 1) desired operating characteristics of each cluster, 2) available physical space, and/or 3) arbitrary location selection. Additional factors, not discussed, may also have contributed to the clustering of the equipments.

Figure 2A:
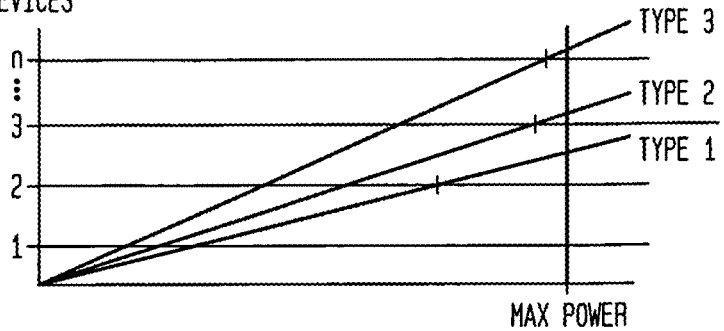
FIGS. 2A-2C illustrate an exemplary vector diagram of measurable environmental parameters.

Typically, equipments may be added to the data center location as long as needed resources are available. FIG. 2A illustrates an exemplary chart of needed power consumption for different types of equipments, which are referred to as Types 1, 2, and 3. These equipments may represent routers, servers, computers, printers, alarm circuits, etc. In this illustrated case, only the needed power consumption is shown for a plurality of the same type of equipment. Similar representation my be developed s for combinations of Types 1, 2 and 3 equipments. However, the number of combination of such presentations would obscure the principles of the invention and need not be discussed in detail herein.

FIG. 2A illustrates that only two (2) Type 1 equipments may be included in a data center as the required power consumption for three devices exceeds the maximum available power. Similarly, only three (3) Type 2 devices may be included in a data the required power for the three devices is less than the maximum power. From FIG. 2A, a determinable number of Type 1, 2 and 3 devices can be included in the data center based on the available resource; power consumption.

Figure 2B:
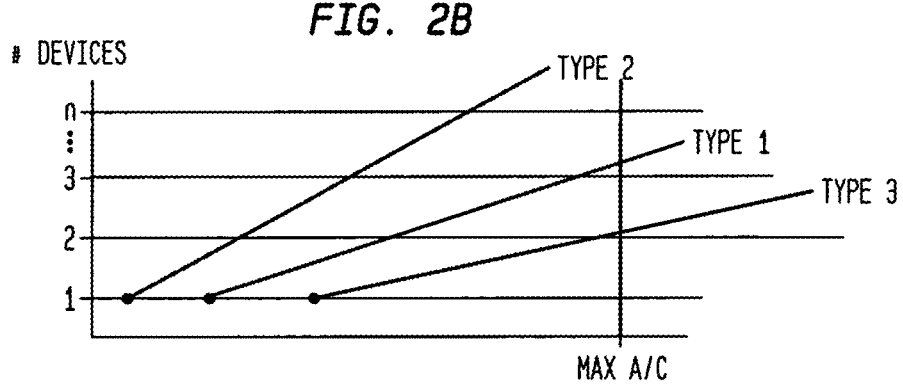

Referring to FIG. 2B, the number of Type 1, 2 and 3 device, however, may be limited by the available air-conditioning resources. Similar to FIG. 2A, the air-conditioning requirement for each of Types 1, 2 and 3 equipments is shown. In this illustrated case, only a single Type 3 equipment may be placed in the data center, while no more than three (3) Type I devices may be included in the data center. Thus, the types and number of each types of equipments that may be included in the exemplary data center shown is further determined based on the combination of maximum power consumption and air-conditioning.

Figure 2C:
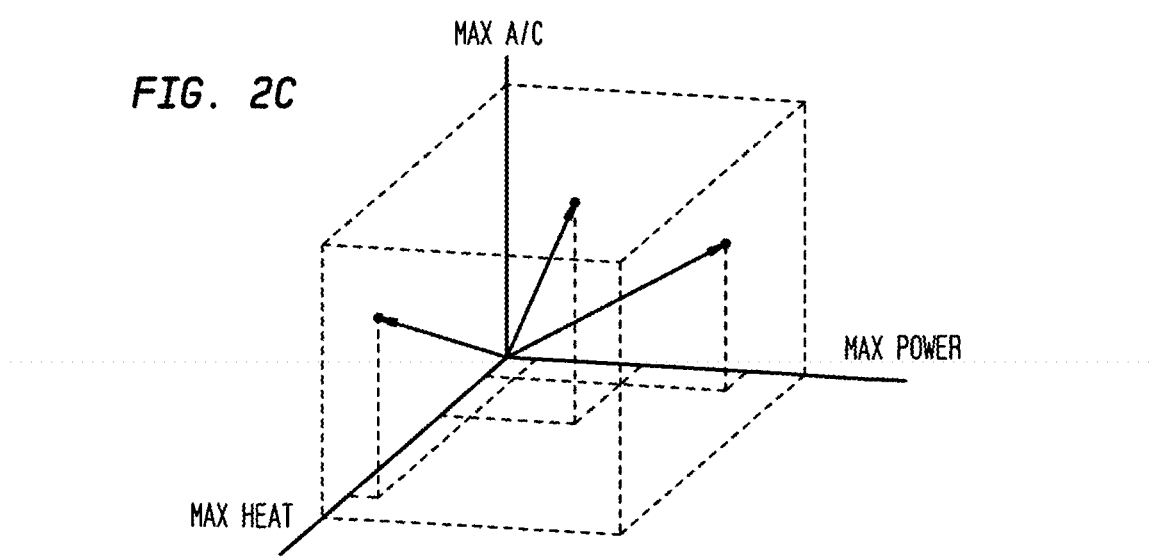

FIG. 2C illustrates a vector diagram for determining equipment types that may be included in an exemplary data center based on exemplary resources, power, heat generation and air-conditioning. Again, the number and types of equipments that may be incorporated into the data center may be determined by maintaining a vector addition of the illustrated parameters within an envelope, represented as dashed lines, of maximum power, heat generation and air-conditioning.

However, while determining the type and number of types of equipments that may be included in a data center, the affect of the determined type and number of types of equipments on the surrounding environment is not considered. That is, the placement of the equipments may cause, for example, hot spots to be generated (heat generation) in the data center that cause the generation of greater amount air-conditioning. The increased air conditioning may result in cool spots located in the areas where equipment is not located. For example, referring back to FIG. 1, cluster 140 may generate significant amount of heat that creates a hot spot that increases the required amount of air-conditioning, however, the overall generation of air-conditioning may remain within the maximum available air-conditioning resource. Similarly, cluster 120 may generate an amount of heat that is greater than that of cluster 130 because of the density of the equipment placement or because of the types of equipments. and additional air-conditioning may be required to maintain the room temperature at a proper level.

Hence, additional factors regarding location and placement of equipments must be considered in managing the data center to provide a relatively minimum utilization of available resources and impact on the environment.

However, as additional factors are introduced to determine needed resources, the rules and tools needed to process the information become prohibitively complex. Further as additional factors are considered or changes to the rules are incorporated the tools may have to be redeveloped.

Figure 3:
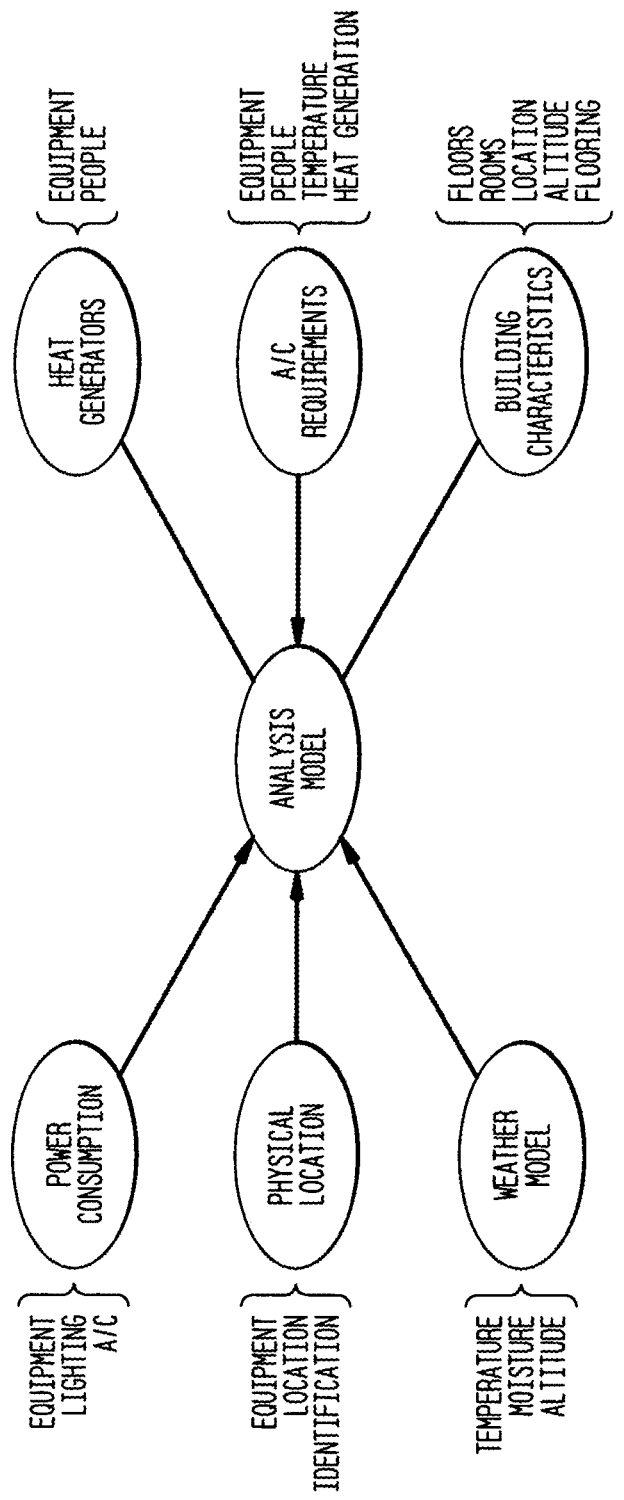
FIG. 3 illustrates a model representation of the principles of the present invention.

FIG. 3 illustrates an exemplary representation of an analysis model in accordance with the principles of the invention. In this exemplary representation, factors such as sources of power consumption, location and identification of equipments, weather conditions, and data center physical characteristics, air-conditioning factors and sources of heat generation are modeled and provided to an analysis model. The analysis model evaluates the provided information, determines conditions or sources that have an adverse impact on environmental conditions and provides recommended solutions to overcome the determined adverse impact.

Figure 4:
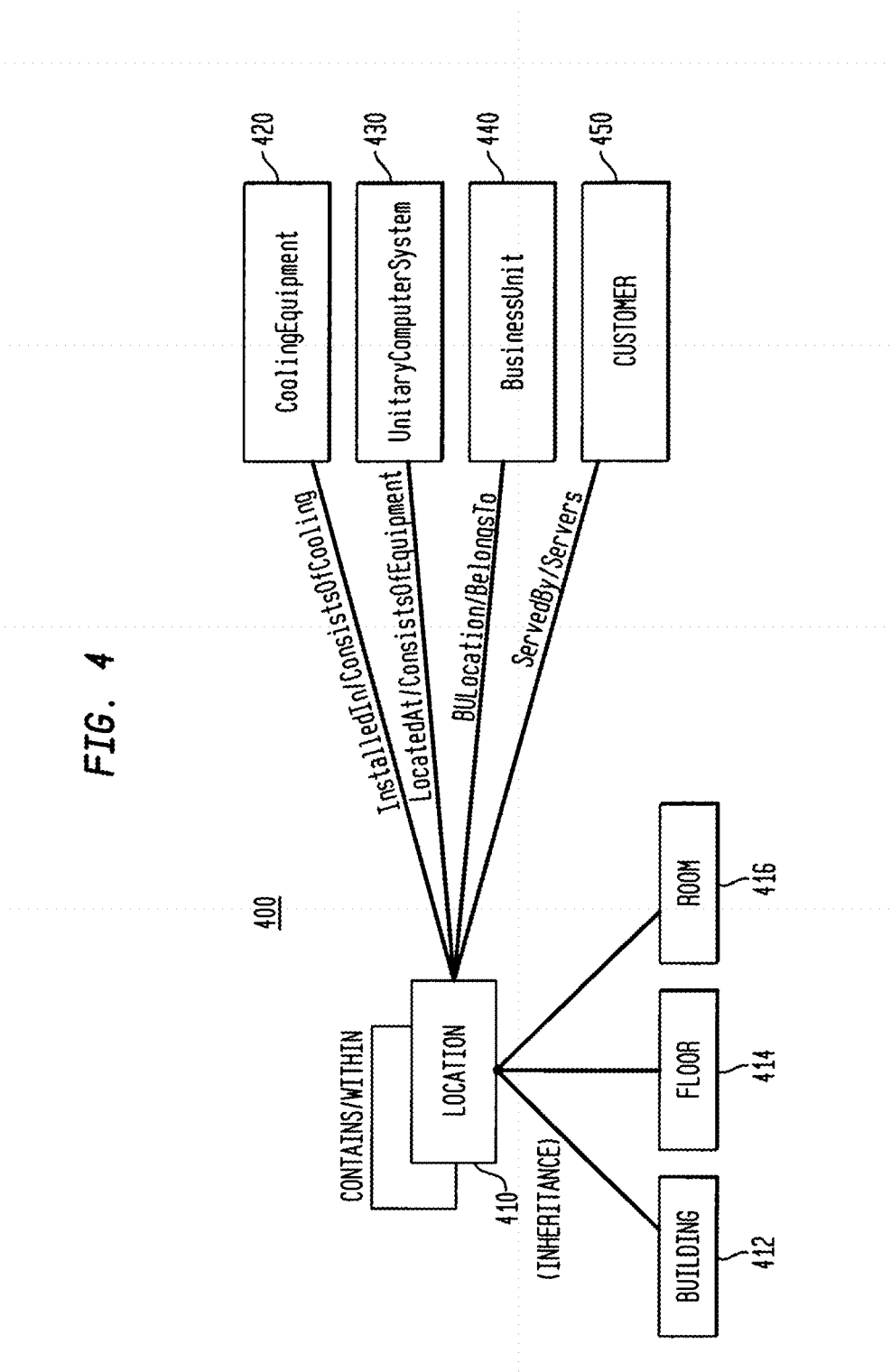
FIG. 4 illustrates an exemplary representation of environmental model in accordance with the principles of the invention.
Figure 5:
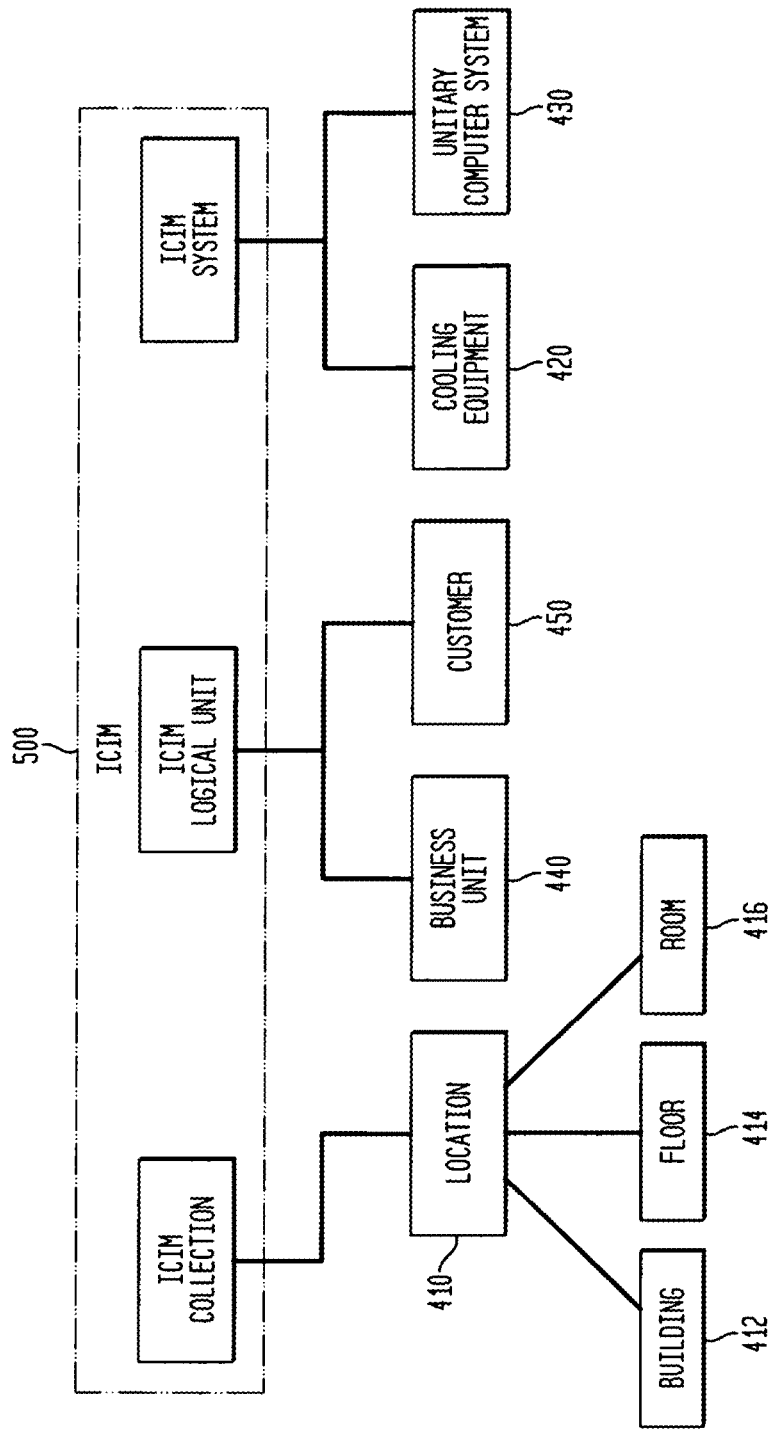
FIG. 5 illustrates an exemplary representation of the incorporation of the environmental model shown in FIG. 4 into a distributed system model.

FIGS. 4 and 5, collectively, illustrate an exemplary embodiment of a data center model in accordance with the principles of the present invention. The model shown is an extension of a known distributed system models, such as the EMC/Smarts Common Information Model (ICIM), or similarly defined or pre-existing CIM-based model and adapted for the environmental distributed system, as will be discussed. EMC and SMARTS are registered trademarks of EMC Corporation, Inc., having a principle place of business in Hopkinton, Mass., USA. The EMC/Smarts model is an extension of the well-known DMTF/SMI model. Model based system representation using the ICIM model is discussed in the commonly-owned U.S. patent application Ser. No. 08/249,282, entitled, "Apparatus and Method for Event Correlation and Problem Reporting," filed on May 25, 1994, now U.S. Pat. No. 5,528,516 and its progeny, the contents of all which are incorporated by reference herein.

FIG. 4 illustrates an exemplary model representation associated with objects of a data center in accordance with the principles of the invention. In this exemplary representation location object 410, which is associated with an equipment placement or location, represents objects such as a room, a floor, and/or a building. Each of these entities is represented by objects "building" 412, "floor" 414 and "room" 416. Objects building 412, floor 414 and room 416 represent the attributes and characteristics of each of the associated entities. The attributes and characteristics of an object may be inherited from attributes and characteristics of elements (in this case, equipment or components) within the object in addition to attributes and characteristics associated with the environmental aspects of the "building" 412, "floor" 414 and "room" 416 objects (e.g., temperature, moisture, heating, cooling, etc.). In addition, "building" 412, "floor" 414 and "room" 416 objects may include an attribute associated with an equipment placement. That is an equipment placement may be identified or represented as a location within a room on a particular floor within a designated room. The location object 410 thus includes as an attribute regarding a floor tile configuration within a room. Floor tiling is typical in a data center to allow air-conditioning and electrical wiring to be concealed below the equipment. Returning to FIG. 1, the floor tiles shown represent a grid that may be numbered sequentially, starting at the upper left, for example, or based on a row/column matrix configuration. Thus, equipments may be represented by the tile(s) upon which they reside within a room. For example cluster 110 may be represented as lying between tile 1, 8 and 3, 8, where the former number represents a row and the latter number represents a column. Similarly, each equipment in cluster 110, for example, may be represented by one or more tiles. Thus, equipment 110.1 may be located at tile (3, 2) and equipment 110.6 located at tile (3, 8). Similarly, rows and/or columns may be identified with a letter (A-Z) designation. Although, not shown it would be recognized that larger equipments may occupy the space of more than one tile and, thus, may be represented as within a range of the designated tiles. In addition, it would be recognized that the objects are not related to any specific distribute system topology or configuration, or elements of a specific distributed system. Rather the exemplary objects presented herein represent the attributes and characteristics of elements or components of not specific to a distributed system topology.

Further illustrated are Cooling Equipment object 420, which represents the attributes and characteristics of the cooling equipment, Unitary Computer System object 430, which represents the attributes and characteristics of equipments or components in the system, the Business Unit object 440, which represents the attributes and characteristics of the business serviced by the equipment at the location and the customer object, which represents the attributes and characteristics of the customer serviced by the equipment at the location. Also illustrated are the relationships between the objects shown. For example, the cooling equipment object 420 is related to the location object as being "installed in" the location while the location is related as consisting of cooling equipments. Similar relationships are shown for each of the remaining objects. The Unitary Computer System object 430, representing equipments within location object 410, includes attributes or characteristics that may be predetermined (e.g., idle power consumption, operating range, etc.) or determined dynamically (e.g., operating temperature, number of transactions per unit time). As would be recognized the attributes and characteristics of the equipments (whether predetermined or periodically updated) may be further attributed to "room" 416, to "floor" 414 and to "building" 412 objects, respectively. The predetermined attributes and characteristics may be provided, for example, from manufacturer supplied values or may be provided by a configuration-management data base (CMDB) that may include attributes associated with power and environmental aspects. The values stored or retained in the CMDB may be further dynamically populated based on monitored or determined power and/or environmental characteristics, as described provided herein. Preferably, attributes and characteristics associated with power, power requirements and/or power consumption may be stored independently in a power-aware CMDB.

FIG. 5 illustrates an exemplary incorporation of the environmental model shown in FIG. 4 into a known distributed system model. In this exemplary presentation, the environmental model object "location" 410 and its child objects (building 412, floor 414 and room 416) are elements of the ICIM Collection object. The ICM Collection object represents a collection of ICIM Managed Elements. ICIM Managed Elements represent the root class of the ICIM class hierarchy. All ICIM elements representing managed objects inherit the attributes and characteristics form ICIM Managed Element. The environment model objects "business unit": and "customer" 450 are elements of the ICIM Logical Unit object. The ICIM Logical Unit object or Element or Device represents a base class of all the components of a System that represent system components, such as files, processes and/or system capabilities. The "cooling equipment" 420 and "unitary computer system" 430 objects are elements of the ICIM System object. The ICIM System is an ICIM Logical Element that aggregates an enumerable set of managed system elements. The aggregation operates as a functional whole. Within any particular subclass of system, there is a well-defined list of managed system element classes whose instances must be aggregated. By including selected objects as elements of known existing objects, the selected objects incorporate or inherent the attributes and characteristics of the known existing objects and, thus, these common attributes and characteristics need not be redefined or presented for the new objects.

Figure 6:
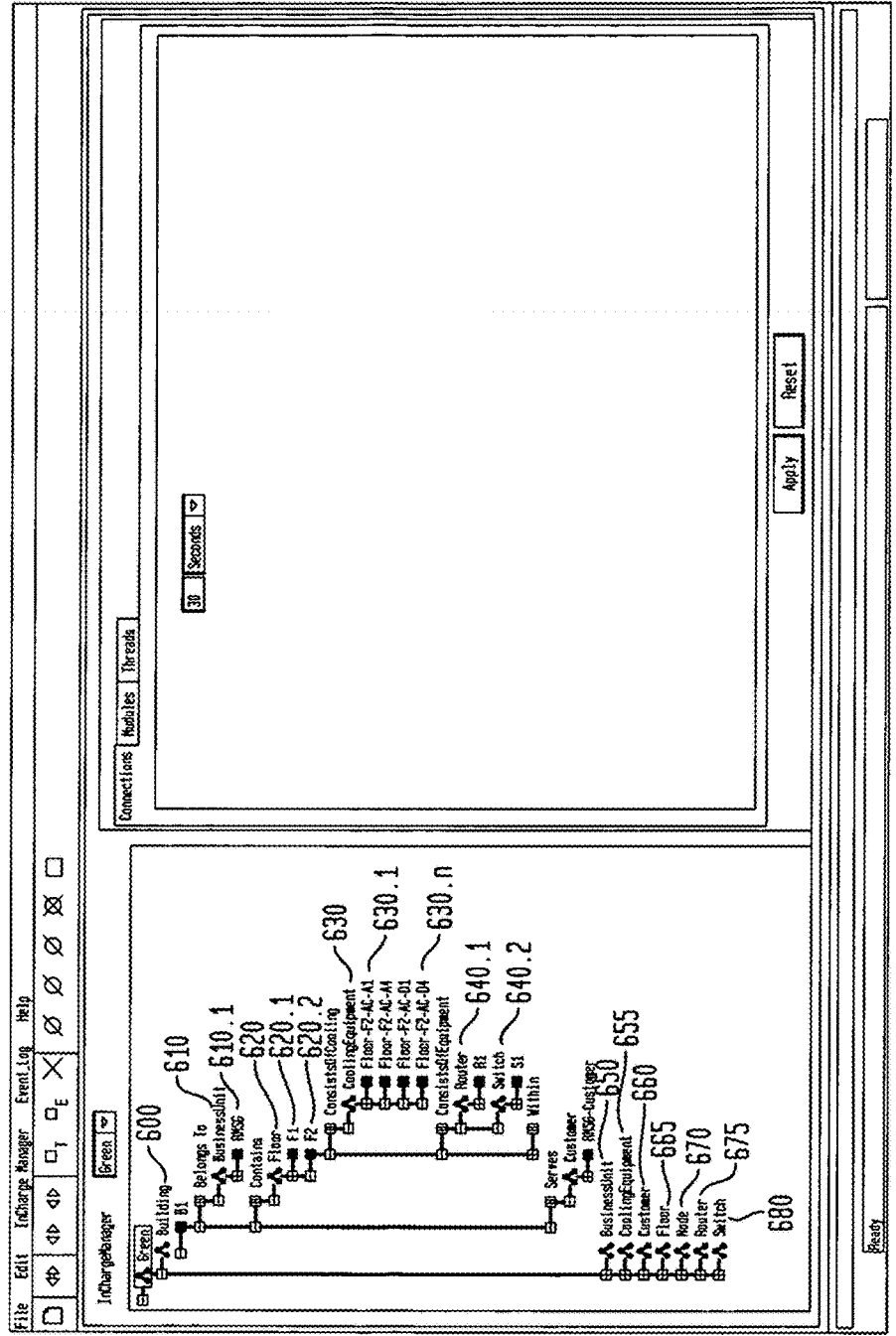
FIG. 6 illustrates an exemplary topology representation of an exemplary data center in accordance with the principles of the invention.

FIG. 6 illustrates a hierarchical representation of the exemplary environment model in accordance with the principles of the invention. In this illustrated example, Building objection 600, identified as B1, "belongs to" a business unit 610, identified as RMSG and "contains" a floor object 620. Floor object 620 includes two floors, identified as F1, 620.1 and F2, 620.2. Floor object 620.1 possesses a "consists of cooling" relationship to cooling equipment object 630, which includes cooling equipment on F2, tile location A1, A4, D1 and D4. Floor object 620 further "consists of equipment" router, 640.1, identified as R1, and switch 640.2 identified as S1. Thus, the inter-relationships of the elements of a building housing a data center providing "service" to customer RMSG-Customer are shown.

Also shown, but not in expanded form, are objects Business Unit, Cooling Equipment, Customer, Floor, Node, Router, and Switch, which represent the attributes, parameters and characteristics of individual elements. For example, Router object may include general characteristics of known routers and specific characteristics associated with specific router brands (e.g., Cisco, Dell). Cisco and Dell are registered trademarks of the Cisco Corporation, having a principle place of business in San Jose, Calif., USA and Dell Corporation, having a principle place of business in Round Rock, Tex., USA, respectively. For example, characteristics of equipments may include Typical Heat Dissipation, Maximum Heat Dissipation, Typical Power Consumption, Maximum Power Consumption, Temperature Gradient, Power per Transaction, etc. Similarly, characteristics of room may include length, width, height, raised floor, raised floor height, number of lights, types of lights, number of outlets, available power, etc.

In managing the environmental conditions of a data center, air-conditioning is provided to cool the air surrounding the equipments to compensate for the heat generated by the equipment. Typically, the amount of air conditioning provided is determined by a thermostat that monitors the surrounding air temperature. As the temperature increases, the cooling air is provided until the air temperature is within a desired range. For example, referring to FIG. 1, a single thermostat may be located within the room containing clusters 110-140. However, this method only provides for maintaining a general temperature range and fails to consider factors that may be the primary cause of the increased air temperature (e.g., cluster 140 generating more heat than cluster 120).

To further refine the measurement of required cooling air, multiple thermostats may be located within a room to allow continued cooling air to be provided until the measured temperature is within a desired range. With reference to FIG. 1, thermostats may be located within or near each equipment cluster and cooling air may be provided until the cluster generating the majority of the heat is appropriately cooled.

However, unless each thermostat controls an individual air conditioning unit, the air temperature surrounding one cluster may be cooler than that surrounding another cluster, because one cluster generates more heat than the other cluster. Thus, the use of multiple thermostats is either inefficient in that the air temperature is not uniform, is costly in that multiple air conditioning units are needed for proper temperature maintenance or impractical as the location of equipment clusters is not known a priori. One remedy would be to use wireless thermostatic controls, but this would still require control of multiple air conditioning units.

Hence, in accordance with one aspect of the invention, in addition to monitoring existing or known thermostatic units, or not monitoring such thermostatic units, the location of each equipment in a room may be determined based on a tile location, and an amount of heat generated may be determined based on known characteristics of the equipments and the operational status of the equipments. By designating equipment by floor tile, equipments clusters may be formulated and the heat generated by each cluster determined based on the operational status of the equipments in the cluster. Similarly, the clusters may be formulated into rooms and the rooms into floors and the floors into a building in order to determine the heat generated at each level. Accordingly, management of the one or more air conditions units may be performed to provide appropriate cooling air to maintain the equipment(s) within a desired temperature range.

Figure 7:
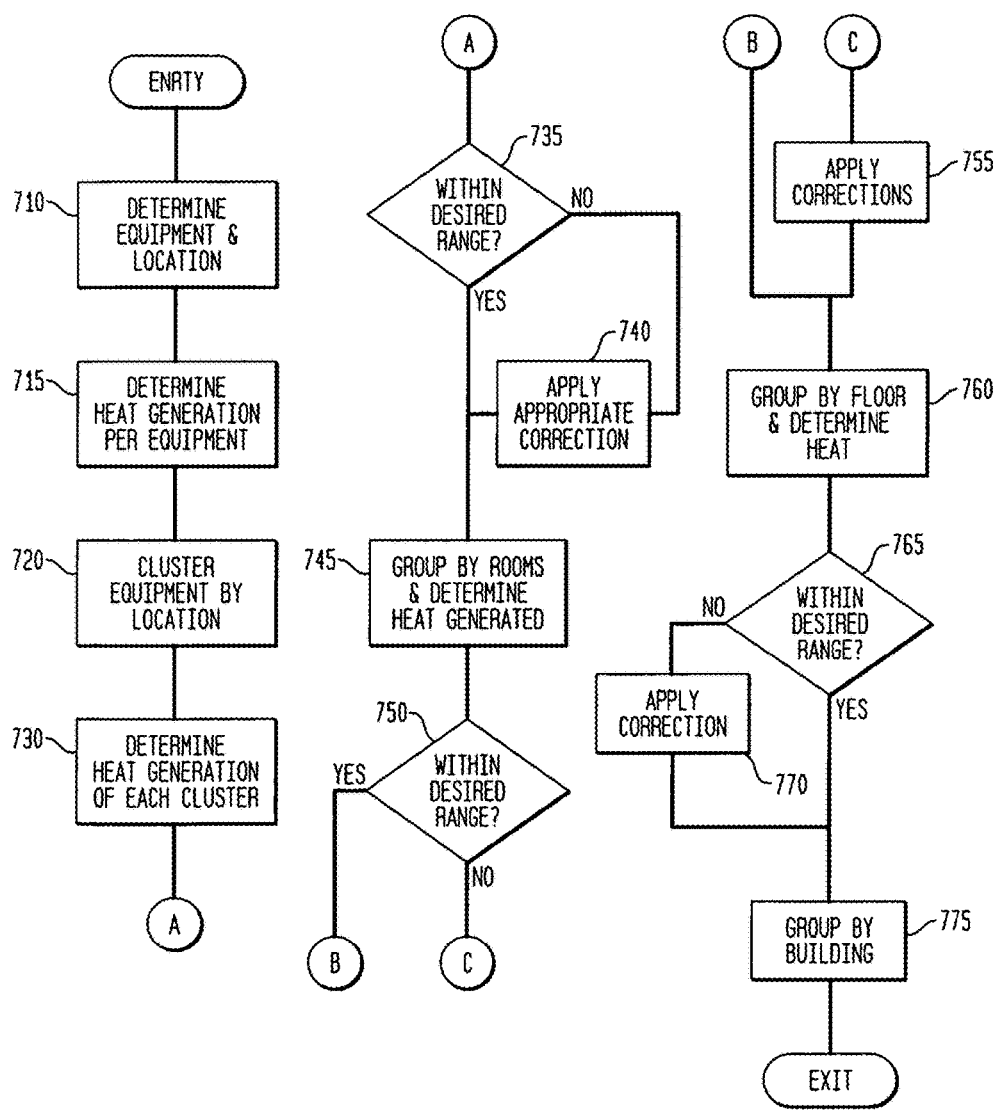
FIG. 7 illustrates a flow chart of an exemplary process for managing a resource in the exemplary data center layout shown in FIG. 1 in accordance with the principles of the invention.

FIG. 7 illustrates a flow chart 700 of an exemplary process for managing resource for a data center in accordance with the principles of the invention. At block 710, each equipment and location within a data center is identified and determined. Identification and discovery of equipment may be made using well-known methods. For example, polling or interrogation may be used to identify each equipment. Thus, a processor or computer system may request that each equipment on a distributed system identify itself by polling either each equipment in a cluster or one device that may be a master for a cluster. Similarly, the equipment may include an RFID tag that can be scanned and provided to a data base of identified equipments. Thus, the characteristics of known equipments, e.g., the illustrated router 675 and server 680 objects shown in FIG. 6, which may stored in a data base, can be obtained to provide an accurate model representation of the data center. The location of the equipment may also be determined based on the tile configuration, as previously discussed. In one aspect the location of the equipments may be obtained by examining a blueprint of the data center configuration. In another aspect, each tile may be configured to provide an indication of an equipment placed thereon.

At block 715, the heat generated by each equipment may be determined based on the operating conditions of the equipment. For example, an equipment power-ed up but not performing any operations generates a first level of heat, which is different than an equipment operating at fifty percent capacity. Similarly an equipment operating at fifty percent capacity generates less heat than an equipment operating at 100 percent capacity. In one aspect, the heat generated by an equipment is dependent upon the power necessary to complete a transaction.

At block 730, a heat measure generated by the cluster is determined. For example, the heat generated may be determined as the sum of the heat generated in each equipment. In this aspect, the heat measure may be determined based on the recorded characteristics of the equipment in the cluster or may be determined based on the power being consumed by the equipments in the cluster. The heat measure may also be determined by a locally located thermostat or by a number of transactions performed per unit time.

At block 735, a determination is made whether the determined heat generated is within a desired range. If not, then appropriate correction is applied, at block 740. Otherwise, the clusters are organized and grouped together based on the room configuration at block 745. The heat generation in the room may then be determined. In one aspect, the heat generated may be determined as the sum of the heat generated by each of the clusters. For example, planning the configuration of the equipments in a room may, in accordance, with the principles of the present invention, include the heat generation factor determined herein.

At block 750, a determination is made whether the determined room heat generated is within a desired range. If not, then appropriate correction is applied at block 755. Otherwise, each of the rooms is grouped into floors and the heat associated with each floor is determined at block 760. The heat for each floor may be determined as the sum of the heat generated by each room. At block 765, a determination is made whether the heat of each floor is within a desired range. If not, then appropriate correction is applied at block 770. Otherwise the floors are grouped into a building at block 775. Although not shown, it would be appreciated that the heat generated by the building may be determined as the sum of the heat generated by each floor. Similarly, if the heat of the building is not within a desired range appropriate correction may be applied.

Figure 8:
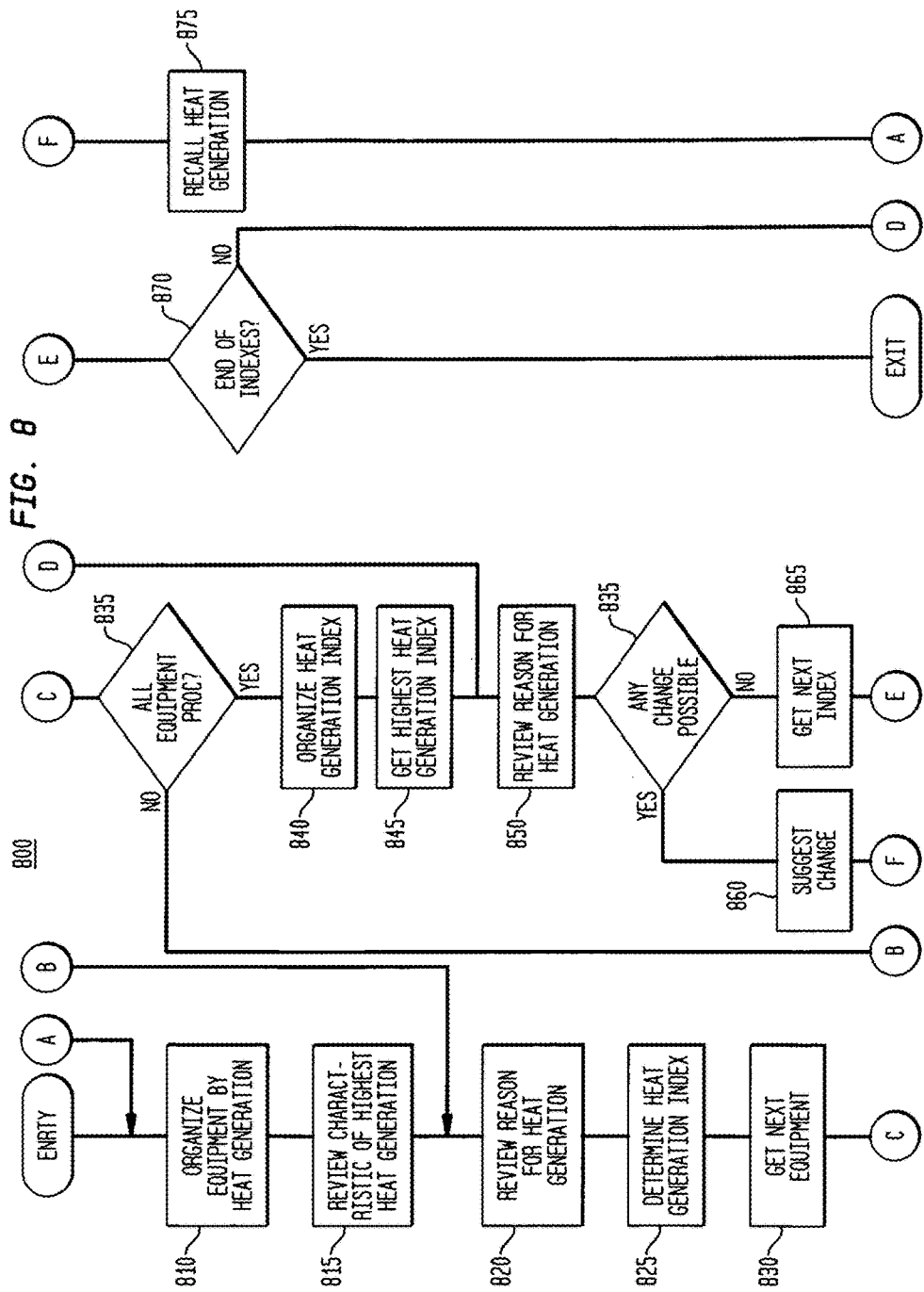
FIG. 8 illustrates a flow chart of an exemplary process for managing a resource at one level of the exemplary data center shown in FIG. 1.

FIG. 8 illustrates a flow chart 800 of an exemplary process for managing a resource in accordance with the principles of the invention. In this exemplary process, which is comparable to the process performed at block 740 in FIG. 7, the equipments are organized by an amount of heat generated at block 810. In this illustrated case, the equipments referred to are those equipments that are within a cluster. At block 815 the characteristics of the highest heat generator are reviewed. At block 820, the reason(s) for the equipment heat generation are reviewed. For example, heat generation may be associated with the operating status of the equipment and the amount of heat generated for each operation being performed. For example, older, legacy, equipment may require more power per transaction and, hence, generate greater heat, than newer equipment even if the newer equipment is operating at greater capacity.

At block 825 a heat generation index is determined based on the reason(s) for the heat generation. At block 830, a next equipment in the heat generation list is obtained and at block 835 a determination is made whether all the equipments have been processed.

If all the equipments have not been processed, then processing returns to step 820 to review the reason(s) for heat generation. However, if all the equipments have been processed, the heat generation indices are organized at block 840. At block 845, the equipment associated with the highest heat generator index is obtained and a review of the reason(s) for the heat generation are again evaluated. At block 855, a determination is made whether any change is possible. If the answer negative, then a next index is obtained at block 865 and a determination is made at block 870 whether all indices have been processed. If the answer is positive, then processing is ended.

Returning to step 855, if the answer is in the affirmative, then a change to the reason for the heat generation is made at block 860. For example, a reason for heat generation may be the equipment is an older, more power computing, equipment. Or a reason for heat generation may be that a plurality of equipments are performing similar operations that may be concatenated into a single or fewer equipments. Or a reason for generating excessive heat, i.e., creating a hot spot, may be that the density of equipments is high and that distribution of the equipment over a greater area (number of tiles) may be desired. Suggested or recommended changes to the equipment(s) configuration are then provided at block 860.

At block 875, the heat generated by each of the equipment(s) affected by the suggested changes is recalculated and stored. The processing returns to block 810 to reorganize the newly calculated reasons for heat generation, as previously discussed.

In another aspect, a recommendation, e.g., an amount of available air-conditioning, or placement of equipment, is provided to, in this case, maintain the generated heat in a cluster of devices within a desired temperature range.

Figure 9:
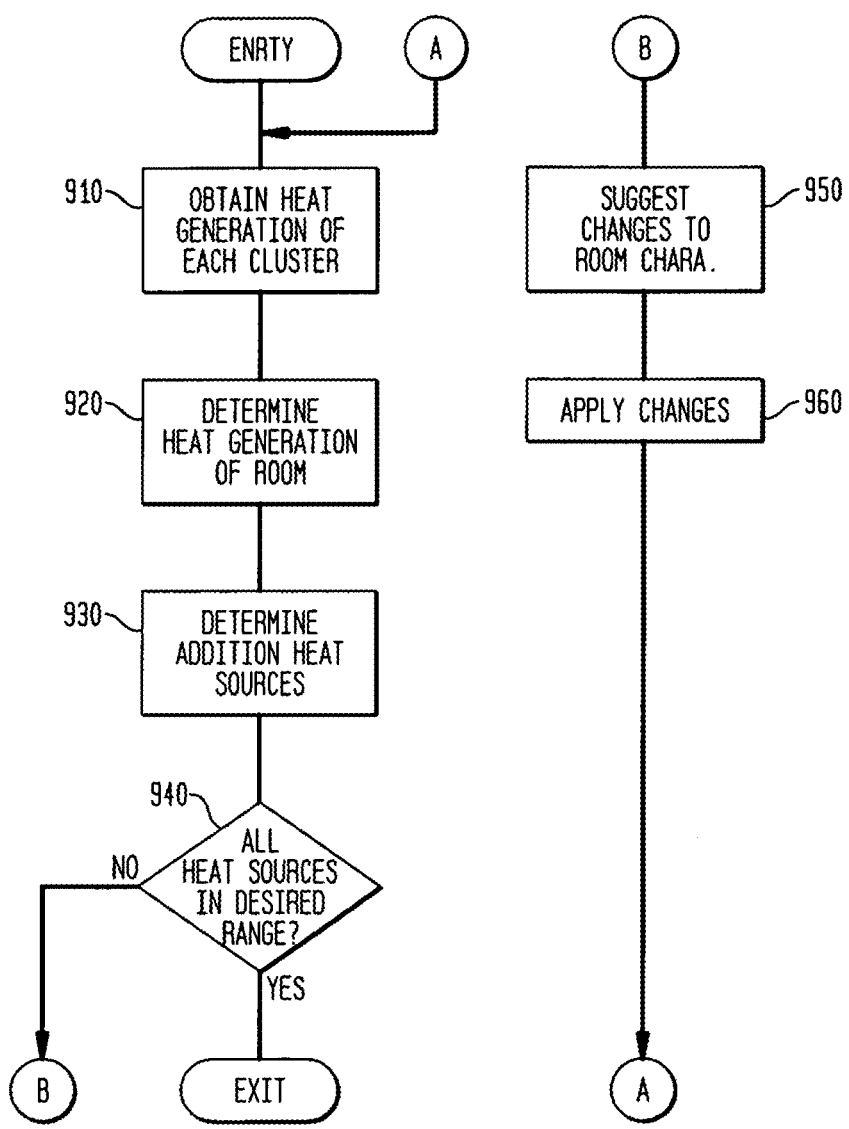
FIG. 9 illustrates a flow chart of an exemplary process for managing resources within an area in accordance with the principles of the invention.

FIG. 9 illustrates a flow chart of an exemplary process for managing resources within an area (e.g., a cluster, a room) of a data center in accordance with the principles of the invention. In this exemplary process, heat generation of each cluster within a room is obtained at step 910. This heat generation may be determined based on whether the heat generation has been compensated as in FIG. 8. At block 920, a heat generation for the entire room is determined at block 920. In one aspect, the heat generated for the entire room may be determined as the sum of the heat generated by each cluster or each equipment. At block 930, a determination is made whether additional heat sources are available in the room. For example, additional heat sources may be a number of people occupying the room or the heat generated by lights that may be powered-on within the room, etc.

At block 940, a determination is made whether the heat generated from all heat sources within the area is within a desired range. If the answer is negative, then at block 950 changes to the operating and/or environmental conditions of the area are suggested to bring the heat generated within the desired range. For example, levels of air conditioning may be altered to provide sufficient cooling to maintain the heat generation within the desired range. In this case, inputs from thermostatic devices may be also evaluated to provide further control of provided cooling air. At block 960, the suggested changes to the operating and/or environmental conditions are applied and processing continues at step 910 to determine the effect of the suggested changes on the conditions within the area.

Although the processing has been shown and discussed with regard to air-conditioning and heat generation, it would be recognized that similar processing may be performed considering power consumption, amount of pollutant generation (e.g., CO, $O_3$, $SiO_2$, $NO_2$, Pb, and Hg), waste management (reuse material, recycle material, etc.), weather conditions, (snow, rain, moisture), geographic location (altitude, latitude), and other environmental aspects.

With respect to the model of a distributed system described herein, planning and/or an analysis may be performed based on a correlation function similar to that disclosed in commonly-owned U.S. patent application Ser. No. 08/249,282, entitled, "Apparatus and Method for Event Correlation and Problem Reporting," filed on May 25, 1994, now U.S. Pat. No. 5,528,516, and its progeny and co-pending U.S. patent application Ser. No. 10/813,842, entitled "Method and Apparatus for Multi-Realm System Modeling," filed on Mar. 31, 2004, published on Jan. 27, 2005 as US Publication number 20050021742, which issued as U.S. Pat. No. 7,930,148 on Apr. 19, 2011, the contents of all of which are incorporated by reference herein. In one aspect, a system analysis may be a root-cause determination or an impact analysis.

In determining causes of changes to the environmental aspects of the distributed system, symptom(s) generally associated with the known characteristics may or may not be generated or detected that indicate a component is causing an environmental impact. A root cause correlation must be powerful enough to be able to deal with scenarios in which symptoms are generated, or not generated, to determine the cause of the detrimental environmental impact. An analysis, e.g., a root cause analysis, of the distributed system, similar to that described in the aforementioned US patents and published patent applications may be used to determine from the exemplary causality or behavior model(s) shown, herein. As described in the related US Patents and published patent applications, a determination of a measure of the elements of the causality matrix shown, herein, may be used to determine the most likely root cause of the one or more of the observed symptoms.

FIG. 10 illustrates exemplary causality/impact analysis of environment considerations in each of the clusters shown in FIG. 1. As described in the aforementioned US Patents and published patent applications, a correlation or mapping of environmental events may be formulated to that relates occurring environmental conditions with observed results or symptoms. A determination of a measure of the values within the causality matrix shown may be used to determine the most likely root cause of the one or more of the observed symptoms. For example, when a change in temperature is detected, the cause of such a change in temperature may be because there in a changing in the heating or cooling characteristics or by a change in the moisture characteristics of an area (e.g., a cluster, a room, etc.). Similarly, an observed change in a heat characteristic may be caused by a change in the heating or cooling characteristics or by a change in the power consumption. As would be recognized, a change in heating or cooling may be caused by a heating or cooling unit operating excessively or not operating at all. Similarly, the impact of a change of characteristic may be projected to determine anticipated events that may be observed. For example, should the moisture in a monitored area increase, then a change in the monitored moisture, or in temperature or mold may be observed. Although, the causality matrix shown may be applied to each cluster, it would be within the knowledge of those skilled in the art to provide such a causality mapping to a room, a floor, a building and/or location to determine the impact of an undesired environmental condition at each level. In addition, the causality matrix associated with each of a plurality of clusters may be processed as described in aforementioned co-pending patent application Ser. No. 10/813,842, which published as US Publication number 20050021742 on Jan. 27, 2005 and which issued as U.S. Pat. No. 7,930,148 on Apr. 19, 2011, wherein each cluster may represent a domain.

Although the examples provided herein are with regard to root-cause analysis and impact analysis, it would be recognized that the methods described herein may be used to perform a system analysis may include: fault detection, fault monitoring, performance, congestion, connectivity, interface failure, node failure, link failure, routing protocol error, and/or routing control errors.

Figure 11:
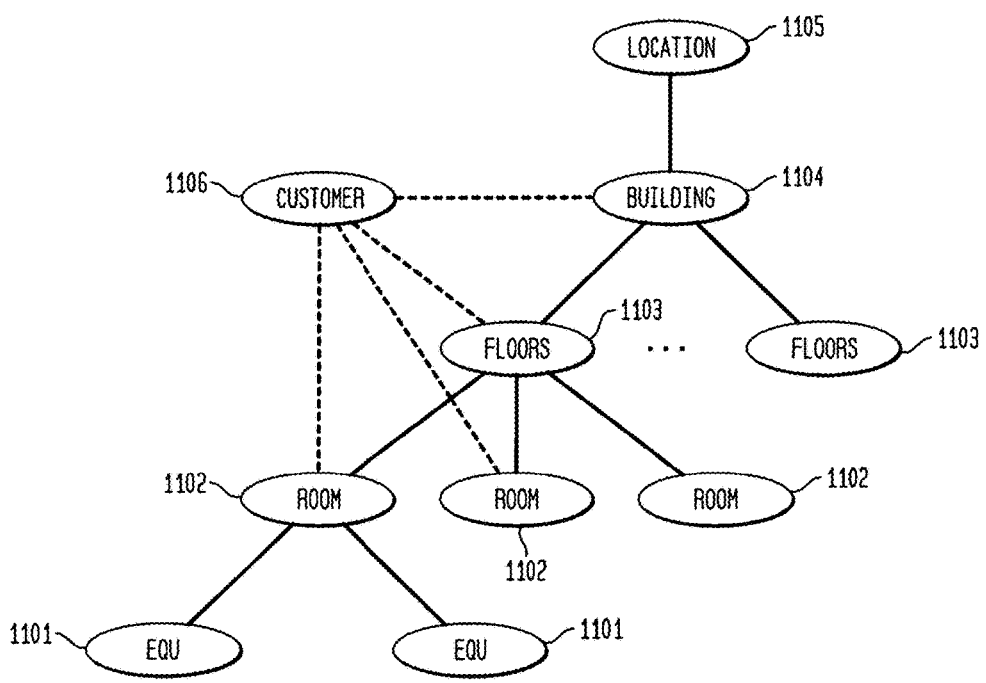
FIG. 11 illustrates an exemplary inherence architecture in accordance with the principles of the invention.

FIG. 11 illustrates the hierarchical relationship of the model representation of the environmental considerations in accordance with the principles of the invention. In this case, a result obtained from an analysis, as described with regard to FIG. 10, may be advanced through progressively higher object levels so that an accumulation of results may be used to determine and isolate a cause of a change in the environmental conditions. For example, changes in equipment 1101 may cause a change at a room level 1102. The characteristics of rooms 1102 may be aggregated to determine the environmental characteristics of an associated floor 1103. The environmental characteristics of each of the floors 1103 may be aggregated to determine the environmental characteristics of building 1104 and also a location 1105, which may include a plurality of buildings (not shown). Similarly, the environmental characteristics may also have an impact on the operation of a customer 1106, as a customer may only be associated with parts of a building 1104, a floor 1103 or a room 1102.

Figure 12:
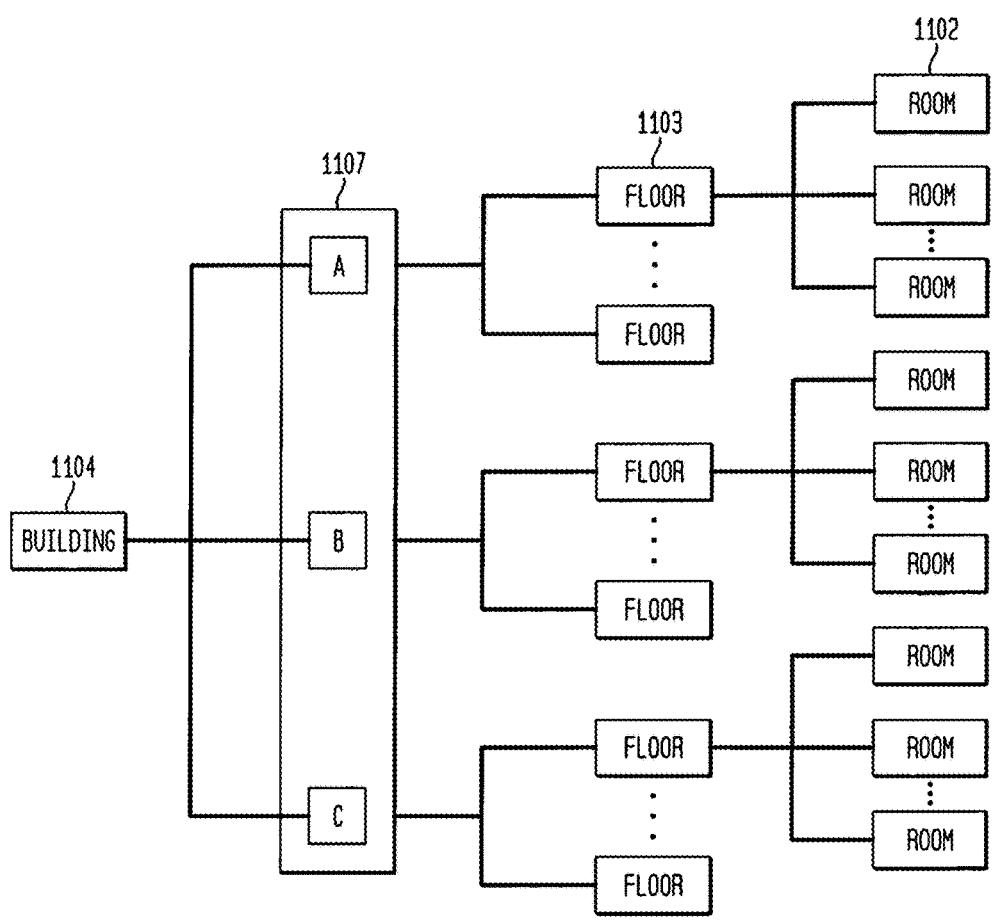
FIG. 12 illustrates a second example of inherence in accordance with the principles of the invention.

FIG. 12 illustrates another aspect of the invention, wherein characteristics of rooms 1102 are aggregated to floors 1103 and select floors 1103 are aggregated to sub-building levels 1107. In this illustrated model representation, sub-building levels 1107 may represent specific building equipment characteristics. For example, sub-building level A may be associated with one air-conditioning unit (or heating or power generation), while sub-building level B may be associated with another air-conditioning (or heating or power generation) unit. Accordingly, the environmental characteristics of a building may be monitored and analyzed based on the model representation of the equipments and their location within the building.

Figure 13:
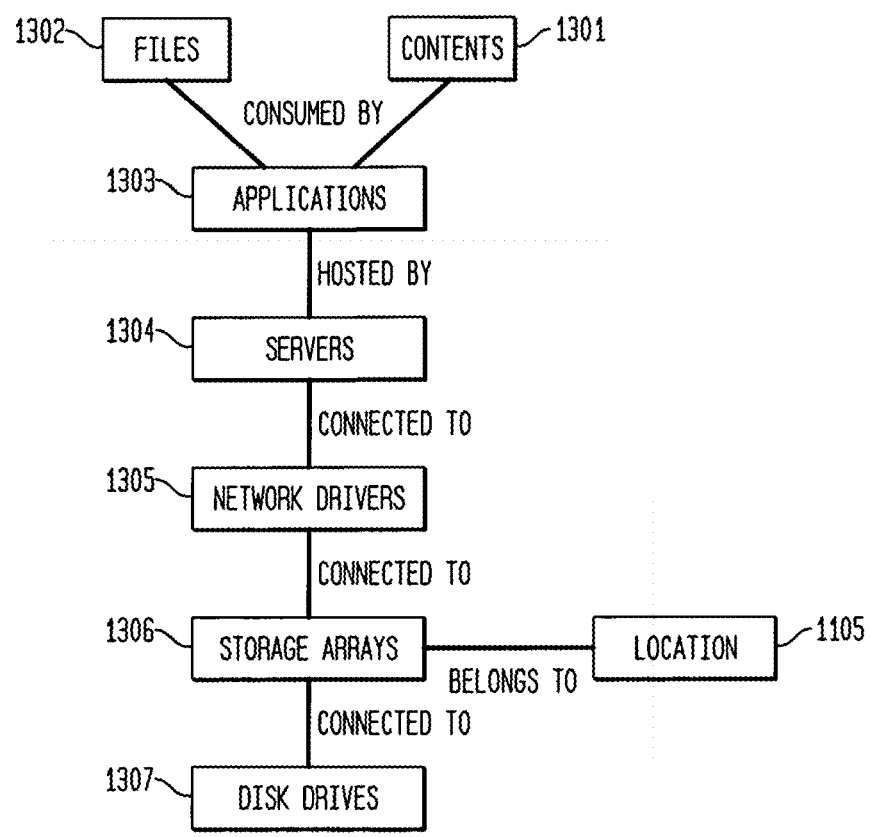
FIG. 13 illustrates a logical representation of a second aspect of the present invention.

FIG. 13 illustrates a flowchart for associating a cost (e.g., power) for storing a data item in conjunction with the environmental aspects of sorting the data item. With regard to a data item, that may be represented as content 1301 or a file 1302, the data item is associated with an application 1303. For example, the data item may be a document produced by a word processing application. The application is hosted on one or more servers 1304 that are connected to a network via network drivers 1305. The network drivers are connected to a storage array 1306 that is composed of a plurality of disk drives 1307. The storage array is further identified or associated with a location 1105.

The cost in power for storing data items, may be determined based on the file size, the capacity of the storage device(s), the idle and busy power requirements of each device, the number of disks drives and their status with a storage device, the power per unit driver, the cost of the source of the power (electrical generation costs) and cooling power costs.

In one aspect of the invention, a power cost factor may be determined as $$\text{PowerCostFactor} = \Sigma_{Power/drive}(\text{BusyPower}*PC) + (\text{IdlePower}*PC) + (\text{CoolingPower}*PC)$$

where

BusyPower is the power to maintain a drive in a condition to store a data item;

IdlePower is the power to maintain a drive in a minimal operating state;

CoolingPower is the power required to maintain a desired temperature; and

PC represents the cost of generating the associated power(s).

A cost may further be determined based on the time that the power is needed as:

$$\text{PowerCost} = f(\text{PowerCostFactor}*\text{Time})$$

As would be appreciated, the results of the PowerCostFactor and associated PowerCost determinations may be associated with each device and stored as an attribute or characteristic of the device in a power-aware CMDB.

In one aspect of the invention, the environmental aspects of the cost of setting-up, managing and maintaining a distributed data center may be introduced to adjust an economic cost of setting-up, managing and maintaining the data center. For example, economic costs may be associated with location with regard to cost of rental space, cost of power generation, cost for an amount of heating and cooling, and operational costs. However, the environmental aspects may include factors such as amount of pollutants generated in the cost of power generation, which may be used to adjust an economic cost. Table 2 illustrates an example wherein environmental factors may be used to adjust an economic cost in planning a data center. In this illustrated example, the power costs and environmental factors have been normalized such that the power cost may be a measurable unit, such as milliwatts/data byte, while the environmental factor may concern the cost of generation of power in environmental units. For example, nuclear power generation has less environmental units than coal power generation.

| Criteria | Location 1 | | Location 2 | |
| --- | --- | --- | --- | --- |
| | Power Cost | Environ. Factor | Power Cost | Environ Factor |
| Rental | 4 | 0.9 | 2 | 0.8 |
| Heating | 2 | 0.7 | 0 | 0.3 |
| Cooling | 6 | 0.1 | 5 | 1.0 |
| Operating cost | 2 | 0.5 | 1 | 0.2 |
| Total | 14 | 5.6 | 8 | 6.8 |

As shown in Table 2, the cost of storing a data item at location 1 is in the order of 11 units while the cost of storing the data unit at location 2 is 8 units. These values are determined based on the straightforward cost of storage. However, when environmental factors are considered the cost of storing the data item at location 1 decreases to 5.6. In this illustrated case, the environmental factor for generating the power for cooling at location 1 is significantly less than that at location 2. This may be, for example, because cooling power at location 1 is generated by nuclear power, having a small environmental factor while the cooling power generated at location is generated by coal power. Accordingly, in accordance with the principles of the invention, while cost of storage at location 1 is monetarily higher, its environmental cost is significantly less. The power costs and adjustments thereto may further be stored as an attribute or characteristic of a, for example, device or location, in the power-aware CMDB.

As would be recognized embodiments of the present application disclosed herein include software programs to implement the embodiment and operations disclosed herein. For example, a computer program product including a computer-readable medium encoded with computer program logic (software in a preferred embodiment). The logic is configured to allow a computer system to execute the functionality described above. One skilled in the art will recognize that the functionality described may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more distributed system connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the functionality or processes described herein reconfigures a general purpose digital computer into a special purpose digital computer enabled for implementing the functionality discussed herein. When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network (SAN). The instructions, when carried out by a processor of a respective computer device, cause the processor to facilitate application deployment configuration.

Figure 14:
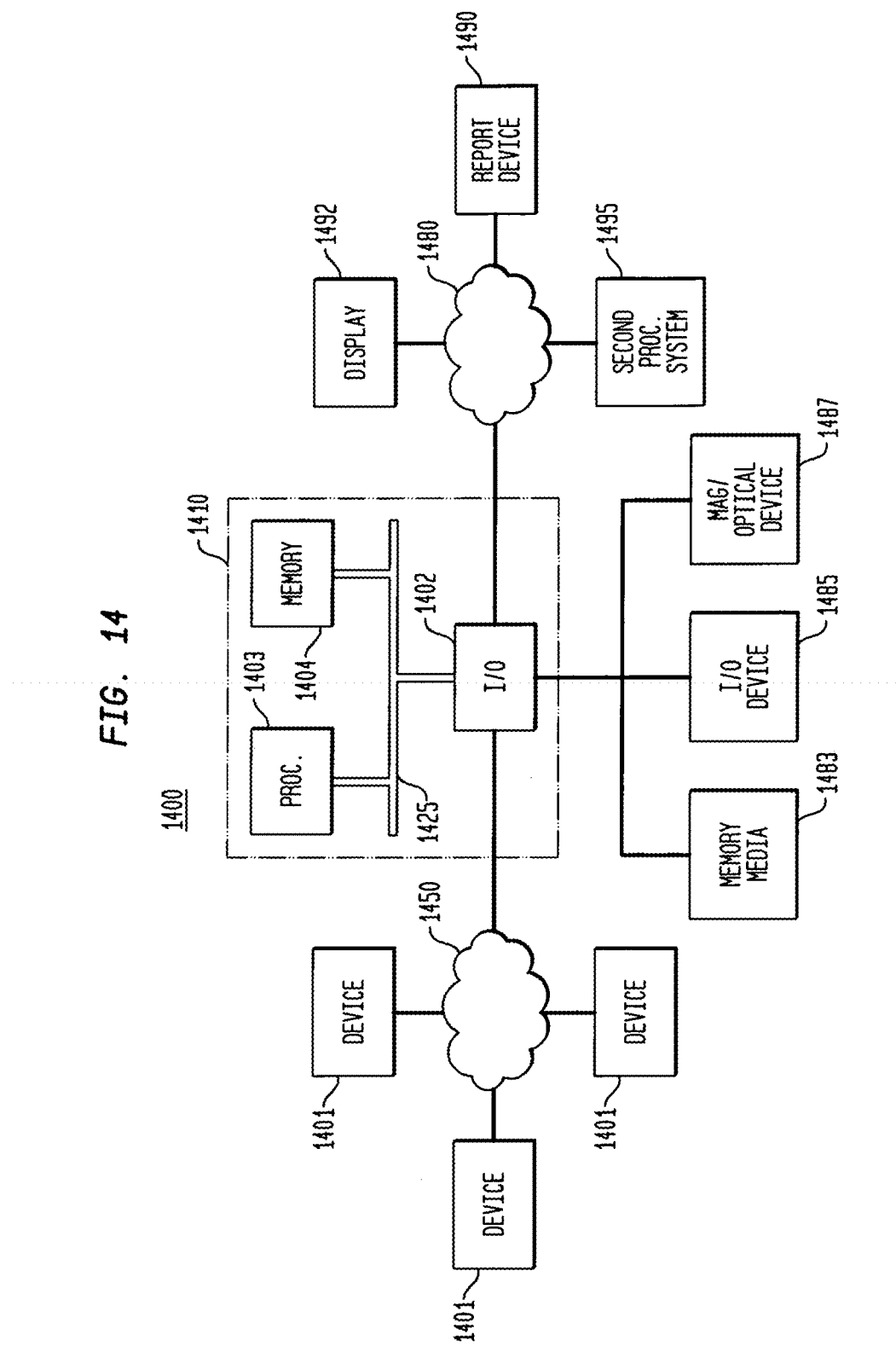
FIG. 14 illustrates a system implementing the processing shown herein.

FIG. 14 illustrates an exemplary embodiment of a system 1400 that may be used for implementing the principles of the present invention. System 1400 may contain one or more input/output devices 1402, processors 1403 and memories 1404. I/O devices 1402 may access or receive information from one or more devices 1401, which represent sources of information. Sources or devices 1401 may be devices such as routers, servers, computers, notebook computer, PDAs, cells phones or other devices suitable for transmitting and receiving information responsive to the processes shown herein. Devices 1401 may have access over one or more distributed system connections 1450 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of distributed systems.

Input/output devices 1402, processors 1403 and memories 1404 may communicate over a communication medium 1425. Communication medium 1425 may represent, for example, a bus, a communication network, one or more internal connections of a circuit, circuit card or other apparatus, as well as portions and combinations of these and other communication media. Input data from the sources or client devices 1401 is processed in accordance with one or more programs that may be stored in memories 1404 and executed by processors 1403. Memories 1404 may be any magnetic, optical or semiconductor medium that is loadable and retains information either permanently, e.g. PROM, or non-permanently, e.g., RAM. Processors 1403 may be any means, such as general purpose or special purpose computing system, such as a laptop computer, desktop computer, a server, handheld computer, or may be a hardware configuration, such as dedicated logic circuit, or integrated circuit. Processors 1403 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 1404. The code may be read or downloaded from a memory medium 1483, an I/O device 1486 or magnetic or optical media, such as a floppy disk, a CD-ROM or a DVD, and then stored in memory 1404. Similarly the code may be downloaded over one or more distributed systems, e.g., 1450, 1480, or not shown via I/O device 1486, for example, for execution by processor 1403 or stored in memory 1404 and then accessed by processor 1403. As would be appreciated, the code may be processor-dependent or processor-independent. JAVA is an example of processor-independent code. JAVA is a trademark of the Sun Microsystems, Inc., Santa Clara, Calif. USA.

Information from device 1401 received by I/O device 1402, after processing in accordance with one or more software programs operable to perform the functions illustrated herein, may also be transmitted over network 1480 to one or more output devices represented as display 1485, reporting device 1490 or second processing system 1495.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, while the examples presented herein have been presented with regard to heat, air-conditioning and power, it would be within the knowledge of those skilled in the art to develop similar evaluations of environmental impacts with regard to and in addition to generated air pollutants, weather conditions, moisture levels, etc.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer-implemented method for modeling, planning, analyzing distributed systems of a data center in view of environmental considerations in the deployment of the distributed systems, the distributed systems comprising a plurality of power-consuming entities receiving power from an electrical grid, the computer method comprising:

computing a first total power cost of operating each of the power-consuming entities and a second total power cost for each of a plurality of physical locations in the data center, wherein each of the first and second total power costs is correlated to at least one environmental factor configured to scale a cost of generating power for the respective power-consuming entity or physical location, the scaling correlated to one or more environmental impacts associated with the way the power is generated, wherein the environmental factor is configured to scale a cost of generating power higher for methods of generating power that have a negative environmental impact;

storing information related to the first and second total power costs as at least one of an attribute and characteristic associated with the respective power-consuming entity or physical location, in a configuration management database (CMDB), wherein the CMDB comprises at least one of attributes and characteristics associated with power and environmental aspects of the data center;

representing a plurality of data center elements using a first plurality of respective objects in a computer analysis model, wherein the data center elements comprise the distributed systems of the data center, physical locations and identification of equipment within the data center, physical characteristics of the data center, weather conditions, air conditioning factors, sources of heat generation, sources of cooling, and sources of power consumption, wherein the first plurality of objects further comprises information denoting first relationships that exist between at least two of more the first plurality of objects, wherein each respective object in the first plurality of objects comprises:

one or more attributes and/or characteristics inherited from other data center elements, if any of the other of the data center elements are located within the respective object;

one or more attributes and/or characteristics inherited from the data center element that the respective object represents; and one or more attributes and/or characteristics inherited from one or more first relationships associated with the respective object;

wherein the attributes and/or characteristics each comprise at least one of a dynamically determined characteristic and a predetermined characteristic, wherein the dynamically determined characteristic is based on monitoring one or more of the data center elements during operation of the data center and the predetermined characteristic is based on at least one of a manufacturer supplied value and a value from the CMDB;

representing one or more location objects as a second plurality of objects in the computer analysis model, wherein at least one of the one or more location objects is selected from the group consisting of: a room object, a floor object and a building object, wherein the location objects correspond to physical locations associated with the data center;

associating each of one or more objects of the first pluralities of objects with a corresponding one or more location objects to denote one or more locations associated with each of the respective one or more objects of the first plurality of objects;

using the computer analysis model to determine whether an environmental aspect associated with a given location object has an adverse impact on any of the first plurality of objects associated with that location object, wherein at least one of the environmental aspects is selected from the group consisting of: heating, cooling, air pollutants, moisture, mold, power consumption, power availability and temperature, wherein the determination of adverse impact is based at least in part on at least one of the dynamically determined and predetermined characteristics and comprises determining whether a total heat generated by the power-consuming entities is within a desired range; and controlling operation of the data center to keep the total heat generated within the desired range in view of at least one of the first and second total power costs, the controlling operation comprising controlling at least one of the power-consuming entities, the air conditioning factors, the sources of heat generation, the sources of cooling, and the sources of power consumption.

2. The method of claim 1, further comprising:

providing a mapping between a plurality of first environmental events and a plurality of second environmental events, wherein the plurality of first environmental events correspond to causes of first environmental events in the distributed system occurring in each of the physical locations experiencing a plurality of second environmental events wherein said plurality of second environmental events represents the effects of the first environmental events in the distributed system, and wherein the mapping represents a second relationship, measured as a relationship value, along which the first events and the environmental aspects of the first plurality of objects are correlated;

determining the existence of at least one first given event of the plurality of first environmental events based on the occurrence of at least one of the plurality of second environmental events by determining a measure between each of the plurality of second relationship values associated with the plurality of first environmental events and the plurality of second environmental events; and providing a recommendation based on the determined at least one first environmental event.

3. The method of claim 1, further comprising:

representing selected objects of the first plurality of objects as a cluster in the computer analysis model, wherein the selected objects are defined to be within a known distance to each other;

representing cooling equipment in the computer analysis model; and calculating an amount of cooling equipment necessary to cool the cluster.

4. The method of claim 3, further comprising aggregating the environmental aspects of each cluster and storing the aggregation in the CMDB.

5. The method of claim 1, wherein at least a portion of the physical locations are determined using a grid representation of an area and wherein the computer analysis model is an extension of a Common Information Model (ICIM) model.

6. The method of claim 1, wherein determining whether a total heat generated by the power-consuming entities is within a desired range comprises determining operating conditions of the power-consuming entities.

7. The method as recited in claim 6, wherein said environmental aspects are determined periodically.

8. The method as recited in claim 1, further comprising adjusting at least one of the first and second power costs of operating by including the environmental aspects in at least one of the first and second power cost calculations.

9. The method of claim 8, further comprising storing information relating to the environmental aspects and the adjustments to the first and second power costs in the CMDB.

10. The method of claim 8, wherein the environmental aspect comprises power consumption and further comprising storing the power consumption and adjustments thereto in the CMDB.

11. The method of claim 1, wherein the environmental aspects are predetermined.

12. The method of claim 2, further comprising storing the recommendation.

13. An apparatus for modeling, planning and analyzing distributed systems of a data center in view of environmental considerations in the deployment of the distributed systems, the distributed systems comprising a plurality of power-consuming entities receiving power from an electrical grid, the apparatus comprising:
   a processor;
   memory in communication with the processor and storing program code which when accessed by the processor causes the processor to execute:
   computing a first total power cost of operating each of the power-consuming entities and a second total power cost for each of a plurality of physical locations in the data center, wherein each of the first and second total power costs is correlated to at least one environmental factor configured to scale a cost of generating power for the respective power-consuming entity or physical location, the scaling correlated to one or more environmental impacts associated with the way the power is generated, wherein the environmental factor is configured to scale a cost of generating power higher for methods of generating power that have a negative environmental impact;
   storing information related to the first and second total power costs as at least one of an attribute and characteristic associated with the respective power-consuming entity or physical location, in a configuration management database (CMDB), wherein the CMDB comprises at least one of attributes and characteristics associated with power and environmental aspects of the data center;
   representing a plurality of data center elements using a first plurality of objects in a computer analysis model, wherein the data center elements comprise the distributed systems of the data center, physical locations and identification of equipment within the data center, physical characteristics of the data center, weather conditions, air conditioning factors, sources of heat generation, sources of cooling, and sources of power consumption, wherein the first plurality of objects further comprises information denoting first relationships that exist between at least two of more the first plurality of objects, wherein each respective object in the first plurality of objects comprises:
      one or more attributes and/or characteristics inherited from other data center elements, if any of the other of the data center elements are located within the respective object;
      one or more attributes and/or characteristics inherited from the data center element that the respective object represents; and
      one or more attributes and/or characteristics inherited from one or more first relationships associated with the respective object;
   wherein the attributes and/or characteristics each comprise at least one of a dynamically determined characteristic and a predetermined characteristic, wherein the dynamically determined characteristic is based on monitoring one or more of the data center elements during operation of the data center and the predetermined characteristic is based on at least one of a manufacturer supplied value and a value from the CMDB;
   representing one or more location objects as a second plurality of objects in the computer analysis model, wherein at least one of the one or more location objects is selected from the group consisting of: a room object, a floor object, and a building object wherein the location objects correspond to physical locations associated with the data center;
   associating each of one or more objects of the first pluralities of objects with a corresponding one or more location objects to denote one or more locations associated with each of the respective one or more objects of the first plurality of objects;
   using the computer analysis model to determine whether an environmental aspect associated with a given location object has an adverse impact on any of the first plurality of objects associated with that location object, wherein at least one of the determined environmental aspects is selected from the group consisting of: heating, cooling, air pollutants, moisture, mold, power consumption, power availability and temperature wherein the determination of adverse impact is based at least in part on at least one of the dynamically determined and predetermined characteristics and comprises determining whether a total heat generated by the power-consuming entities is within a first desired range; and
   controlling operation of the data center to keep the total heat generated within the desired range in view of at least one of the first and second total power costs, the controlling operation comprising controlling at least one of the power-consuming entities, the air conditioning factors, the sources of heat generation, the sources of cooling, and the sources of power consumption.

14. The apparatus of claim 13, further comprising program code that when executed on the processor causes the processor to execute:
   providing a mapping between a plurality of first environmental events and a plurality of second environmental events, wherein the plurality of first environmental events correspond to causes of first environmental events in the distributed system, in each of the physical locations experiencing a plurality of second environmental events, wherein the plurality of second environmental events represents the effects of the first environmental events in the distributed system, and wherein the mapping represents a second relationship, measured as a relationship value, along which the first events and the environmental aspects of the first plurality of objects are correlated;
   determining the existence of at least one first given event of the plurality of first environmental events based on the occurrence of at least one of the plurality of second environmental events by determining a measure between each of the plurality of second relationship values associated with the plurality of first environmental events and the plurality of second environmental events; and providing a recommendation based on the determined at least one first environmental event.

15. The apparatus of claim 13, further comprising program code that when executed on the processor causes the processor to execute:
   representing selected objects of the first plurality of objects as a cluster, in the computer analysis model, wherein the selected objects are defined to be within a known distance to each other;
   determining a heat generation of the cluster; and
   determining whether the heat generated by the cluster is within a second desired range.

16. The apparatus as recited in claim 15, further comprising aggregating the environmental aspects of each cluster and storing the aggregation in the CMDB.

17. The apparatus claim 13, wherein at least a portion of the physical locations are determined using a grid representation of an area and wherein the computer analysis model is an extension of a Common Information Model (ICIM) model.

18. The apparatus of claim 13, wherein determining whether a total heat generated by the power-consuming entities is within a desired range comprises determining operating conditions of the power-consuming entities.

19. The apparatus as recited in claim 18, wherein said environmental aspects are determined periodically.

20. The apparatus as recited in claim 13, further comprising program code that when executed on the processor causes the processor to execute:
   adjusting at least one of the first and second power costs of operating by including the environmental aspects in at least one of the first and second power cost calculations.

21. The apparatus as recited in claim 20, further comprising program code that when executed on the processor causes the processor to execute:
   storing information relating to the environmental aspects and the adjustments to the first and second power costs in the CMDB.

22. The apparatus of claim 20, wherein the environmental aspect comprises power consumption and further comprising program code that when executed on the processor causes the processor to execute: storing the power consumption and adjustments thereto in the CMDB.

23. The apparatus as recited in claim 13, wherein said environmental aspects are predetermined.

* * * * *